April 17, 1934.　　　　R. C. ROE　　　　1,954,949
AIR COOLING AND AIR CONDITIONING DEVICE
Filed Oct. 26, 1932
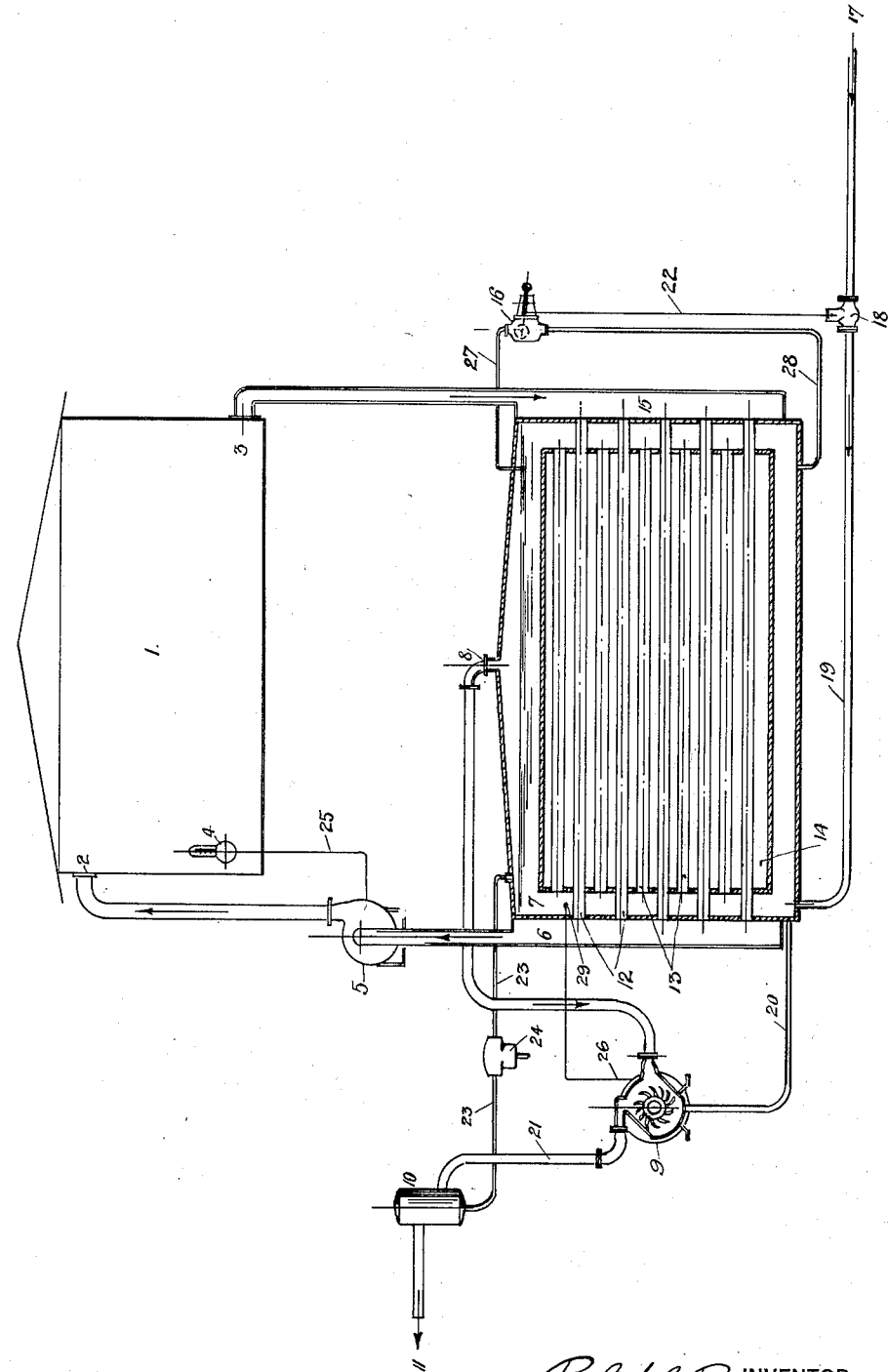
Ralph C Roe INVENTOR
BY
ATTORNEY

UNITED STATES PATENT OFFICE 1,954,949

AIR COOLING AND AIR CONDITIONING DEVICE

Ralph C. Roe, Englewood, N. J.

Application October 26, 1932, Serial No. 639,671

4 Claims. (Cl. 62—152)

My invention relates to improvements in air cooling and air conditioning devices, and more particularly to devices for these functions, for cooling and conditioning rooms and movable vehicles. A further object of my invention is to provide means of accumulating refrigeration and using it when and where desired for the above purposes. A still further object of my invention is to provide, by means of said accumulated refrigeration, energy used for refrigeration over restricted periods and not over the entire time. A still further object of my invention is to provide cooling means which do not involve the use of obnoxious and dangerous fluids or gases. Other objects of my invention become apparent as the specifications appear and proceed.

The present methods of cooling rooms and moving vehicles essentially consist in most cases of the use of well known refrigerants such as methyl chloride, ammonia, etc. in refrigerating cycles and with heat exchange surfaces placed in rooms either directly or indirectly, or by means of such surfaces placed in basements or other convenient locations and a duct system leading from such surfaces to the rooms and returning thereto. The methods of storing refrigeration now in use are by means of water ice or by means of cooled brines, all of which are bulky and in the case of water ice are objectionable because of the replenishment nuisance and the nuisance caused by the melting of said water ice.

In my invention, I propose to use other fluids for storing refrigeration and I further propose to use a harmless and readily available refrigerating fluid, namely water, and I further propose to use this water without recondensing or saving the same. It is a well known fact that water, when under low pressure, such as .1217 lbs. abs. pressure, has a temperature of 40° F. and a latent heat of evaporation of 1069.1 B. t. u. per lb. At lower pressures, temperatures would be further decreased.

The principles of water refrigeration are well known in the art and have been known for years, and it is not my purpose to propose any claims as to the principles involved in water refrigeration per se. Water refrigeration is now being used to a limited extent for air cooling and conditioning, but the apparatus involved therein is complicated and cumbersome and consists of producing vacuum by the circulation of large quantities of water for condensing purposes, which is not always available, and the removal of entrained air, and in some cases water vapor, by steam jet vacuum pumps.

I further propose to use as a freezing, storing and melting medium a moderately low freezing point alcohol known as Decyl alcohol ($C_{10}H_{21}(OH)$) which freezes at 44.6° F. This alcohol, like most alcohols, has a fairly high latent heat of fusion and the latent heat of fusion is the means employed for storing or accumulating the refrigeration. Further explanations and developments of this arrangement will be given as we proceed.

Referring to the drawing, the figure is a diagrammatic representation of the proposed arrangement. In the figure, 1 represents a room, 2 is a conduit leading cool air into said room, 3 is a conduit taking air to be cooled from said room, 4 is a thermostat, 5 is a blower, 6 is an air distributing manifold, 7 is an atmospheric tight enclosure filled with water, 8 is a conduit leading from enclosure 7, 9 is a vacuum pump connected to conduit 8, 10 is a vapor separator from vacuum pump 9 and connected to vacuum pump 9 by conduit 21, 11 is an exhaust conduit from separator 10, 12 are tubes conveying air, 13 are tubes conveying water, 14 is a container interior to enclosure 7 and filled with Decyl alcohol, 15 is an air distribution manifold connecting to conduit 3, 16 is a float type water level regulator, 17 is a water supply line, 18 is a regulating valve connected to water level regulator 16 by connection 22, 19 is a connecting water line from valve 18 to enclosure 7, 20 is a water supply line from vacuum pump 9 to enclosure 7, 21 is a discharge conduit from vacuum pump 9 to separator 10, 22 is a connection between regulator 16 and valve 18, 23 is a return connection from separator 10 to enclosure 7, 24 is a vacuum trap in connection 23 to prevent loss of vacuum in enclosure 7, 25 is a thermostatic control from thermostat 4 to motor on blower 5 (motor not illustrated), 26 is a thermostatic control from thermostat 29 in water in enclosure 7 to motor on vacuum pump 9 (motor not illustrated), 27 and 28 are connections between enclosure 7 and regulator 16, 29 is a thermostat installed in water space of enclosure 7.

In operation, vacuum pump 9 is driven by a suitable motor, or in some cases other forms of power, evacuating enclosure 7 by means of conduit 8 to a suitable pressure, such as .1217 lbs. abs. In so doing all noncondensable gases in this chamber are removed and in addition thereto the water is vaporized and thereby cooled to a temperature corresponding to the pressure. In this case, for the sake of illustration, we will say that the temperature and pressure are .1217 lbs. abs. and 40° F. Through tubes 13, the Decyl alcohol in container 14 gives up heat to water in enclosure 7 and continues to give up heat until it has given up its specific heat and its latent heat of fusion, this heat vaporizing water in enclosure 7, the vapors of which are removed by vacuum pump 9 through conduit 8 and conduit 21 to separator 10, wherein condensed vapors are separated from the noncondensed vapors and returned by means of line 23 and trap 24 to enclosure 7.

Vacuum pump 9 is illustrated as being the type of vacuum pump which pumps gases by entrainment with water slugs, the water for that purpose being supplied by water supply line 20. The water which has been evaporated from enclosure 7 is replaced by action of regulator 16, through connections 27 and 28 and connecting rod 22, acting on valve 18, this arrangement maintaining constant water level in enclosure 7. In this manner, considerable refrigeration is accumulated in container 14 in the form of latent heat of the Decyl alcohol.

To cool the room, blower 5 is operated under the control of thermostat 4 and thermostatic control connection 25 passing air from room, through connection 3, manifold 15, tubes 12, manifold 6, blower 5 and connection 2. This air is cooled through contact with tubes 6 and with the Decyl alcohol exterior to such tubes and to a lesser degree with the water in enclosure 7, the amount of air circulated being controlled as previously explained to keep the room at the desired temperature. In this manner, it is possible for energy to be used to store or accumulate refrigeration during the off peak hours of the electric service company supplying power and this refrigeration may then be used to keep the building or room cool during all other hours of the day, even though the refrigeration apparatus is in itself not operating.

In order to prevent over cooling and wasting energy, thermostat 29 is installed in water in enclosure 7 and connected to control the motor on vacuum pump 9. This thermostat may be set some 5° or thereabouts lower than the solidifying point of the Decyl alcohol and therefore serves to cut out the operation of vacuum pump 9 when the alcohol has given up its latent heat of fusion and the total body has been reduced in temperature sufficiently to actuate the thermostat.

As a substitute for the particular alcohol chosen, Dodecyl alcohol ($C_{12}H_{25}(OH)$) may be used either alone or mixed with Decyl alcohol in such proportions as to produce a freezing point which is lower than Dodecyl alcohol and higher than Decyl alcohol. Other fluids may be used in place of the alcohols for the same purpose, but these are chosen as they are among the best fluids available for that purpose and are my preferred fluids. In cases where desirable, fluids could be chosen whose boiling point is within the range desired for stored refrigeration and in those cases the latent heat of vaporization would be used to store refrigeration rather than the latent heat of fusion. It is obvious that a greater storage of refrigeration can be procured by my preferred method than by this method because the volumes of the fluids are less in proportion to the amount of refrigeration stored when using latent heat of fusion than when using latent heat of vaporization.

It is obvious that this device is useful for other purposes than for cooling air and may be used for cooling water and other fluids. Therefore, it is in the scope of this invention to use the principle involved herein to cool other fluids and products besides air.

While I have shown and described one embodiment of my invention in accordance with the patent statutes, it is understood that my invention is capable of embodiment in a variety of forms of apparatus and that I am not limited to the specific form or arrangement of the structural parts shown and described, but that the scope of my invention is to be gaged by the accompanying claims taken in connection with prior art.

I claim:

1. In an air conditioning system, an enclosure containing air, a closed container partially filled with water, an evacuating means connected with said container, a freezable substance in heat transfer relation with said water, air in heat transfer relation with said freezable substance, means for transporting said air to said enclosure.

2. In an air conditioning system, an enclosure containing air, a closed container partially filled with water, an evacuating means connected with said container, a freezable substance in heat transfer relation with said water, air in heat transfer relation with said freezable substance, means for transporting said air to said enclosure, a thermostatic means controlling said air transportation.

3. In an air conditioning system, an enclosure containing air, a closed container partially filled with water, an evacuating means connected with said container, a thermostatic means controlling said evacuating means, a freezable substance in heat transfer relation with said air, air in heat transfer relation with said freezable substance, means for transporting said air to said enclosure.

4. In an air conditioning system, an enclosure containing air, a closed container partially filled with water, an evacuating means connected with said container, a thermostatic means controlling said evacuating means, a freezable substance in heat transfer relation with said water, air in heat transfer relation with said freezable substance, means for transporting said air to said enclosure, a thermostatic means controlling said air transportation.

RALPH C. ROE.